United States Patent [19]
Friend et al.

[11] Patent Number: 6,101,981
[45] Date of Patent: Aug. 15, 2000

[54] PET COLLAR

[76] Inventors: Roxane Friend; James R. Friend, both of 11555 W. Grand River Ave., Lowell, Mich. 49331

[21] Appl. No.: 09/149,178

[22] Filed: Sep. 8, 1998

[51] Int. Cl.[7] .................................................. A62B 35/00
[52] U.S. Cl. ............................................................. 119/860
[58] Field of Search ................................... 119/856, 860, 119/863, 865

[56] References Cited

U.S. PATENT DOCUMENTS

| | | | |
|---|---|---|---|
| 1,081,148 | 12/1913 | Quayle | 119/860 |
| 2,175,283 | 10/1939 | Cote | 119/856 |
| 2,349,713 | 5/1944 | Finch | 119/860 |
| 2,791,202 | 5/1957 | Doyle | 119/860 |
| 3,213,830 | 10/1965 | Wiesemann | 119/860 |
| 3,814,061 | 6/1974 | Aries et al. | 119/863 |
| 4,068,624 | 1/1978 | Ramney | 119/860 |
| 4,091,766 | 5/1978 | Colliard | 119/860 |
| 4,141,322 | 2/1979 | Evans et al. | 119/856 |
| 4,208,986 | 6/1980 | Costanzo | 119/860 |
| 4,900,876 | 2/1990 | Bushman et al. | 119/860 |
| 4,901,674 | 2/1990 | Bushman et al. | 119/860 |
| 4,930,451 | 6/1990 | Miller et al. | 119/860 |
| 5,144,913 | 9/1992 | Yasui | 119/860 |
| 5,146,875 | 9/1992 | Bolt | 119/860 |
| 5,184,573 | 2/1993 | Stevens, Jr. | 119/106 |
| 5,307,764 | 5/1994 | Moy | 119/856 |
| 5,555,848 | 9/1996 | Trujillo et al. | 119/654 |
| 5,865,148 | 2/1999 | Aguirre et al. | 119/863 |

FOREIGN PATENT DOCUMENTS

| | | | |
|---|---|---|---|
| 2703214 | 10/1994 | France | 119/856 |
| 15023 | 8/1893 | United Kingdom | 119/856 |

*Primary Examiner*—Peter M. Poon
*Assistant Examiner*—Fredrick T. French, III
*Attorney, Agent, or Firm*—Van Dyke, Gardner, Linn & Burkhart, LLP

[57] ABSTRACT

A collar for a pet which improves the smell of the pet includes a strap having first and second ends which are adapted for coupling to each other, and a scent/deodorant producing element supported by the strap. Preferably, the scent/deodorant producing element is positioned in a cavity defined in or on the strap. The cavity includes an access opening through which the scent/deodorant producing element is inserted into the cavity and through which the scent/deodorant producing element is removed for replacement. The cavity preferably includes a closure mechanism, such as velcro, snaps, or stitching to close the access opening. The scent producing element may comprise, for example, a heat activated scent/deodorant stick or a scented/deodorant impregnated element, such as a scent/deodorant impregnated cloth or scent/deodorant impregnated string.

17 Claims, 1 Drawing Sheet

PET COLLAR

TECHNICAL FIELD AND BACKGROUND OF THE INVENTION

The present invention relates to a collar for a pet and, more particularly, to a collar which improves the smell of the pet.

Many pets, especially dogs, produce a distinctive body odor which is often offensive to pet owners and their friends or relatives. In dogs, this odor often emanates from the mouth of the dog. Additionally, this odor may come from the skin, fur, hair, or oils produced by glands of the pet. Many attempts have been made to eliminate pet odor, especially in dogs. For example, pet food manufacturers have made tartar cleaning dog biscuits, or the like, to reduce the odor which is generated in the mouth of the pet. However, these tartar reducing biscuits do not produce lasting effects and do not alleviate the scent which is generated by the skin of the pet, fur, or hair of the pet.

Consequently, there is a need for a product which will neutralize, deodorize, or mask all pet body odors.

SUMMARY OF THE INVENTION

Accordingly, the present invention provides a collar for a pet which includes a strap and a scent producing and/or deodorizing element supported by the strap. The strap includes first and second end portions with the first end portion adapted for coupling to the second end portion for securing the strap to the pet.

In one aspect, the strap includes a cavity. The scent and/or deodorizing producing element is positioned in the cavity to thereby support the scent producing element. The cavity preferably includes an access opening for inserting the scent/deodorant producing element in the cavity and for retrieving the scent/deodorant producing element from the cavity. Furthermore, the cavity preferably includes a closure mechanism, such as velcro, snaps, or stitching. In other aspects, the scent/deodorant producing element comprises a heat activated scent producing element. For example, the scent/deodorant producing element may comprise a heat activated stick. Other scent/deodorant producing elements include a scent/deodorant impregnated element, such as a scent/deodorant impregnated cloth or a scent impregnated string.

According to another aspect of the invention, a collar for a pet includes a strap having first and second strap members secured together and first and second ends. The strap includes a cavity defined between the first and second strap members and between the first and second ends. The strap is adapted to form a closed loop for securing to the pet. A scent/deodorant producing element is supported in the cavity of the strap.

Other aspects include the cavity including an access opening for inserting the scent/deodorant producing element into the cavity and for removing the scent/deodorant producing element from the cavity. For example, the access opening may extend along the longitudinal extent of the strap. Furthermore, the cavity preferably includes a closure mechanism for closing the access opening.

These and other objects and features will become more apparent from a study of the drawings in conjunction with the description of the preferred embodiments which follow.

DESCRIPTION OF THE PREFERRED EMBODIMENTS

Figure 1:
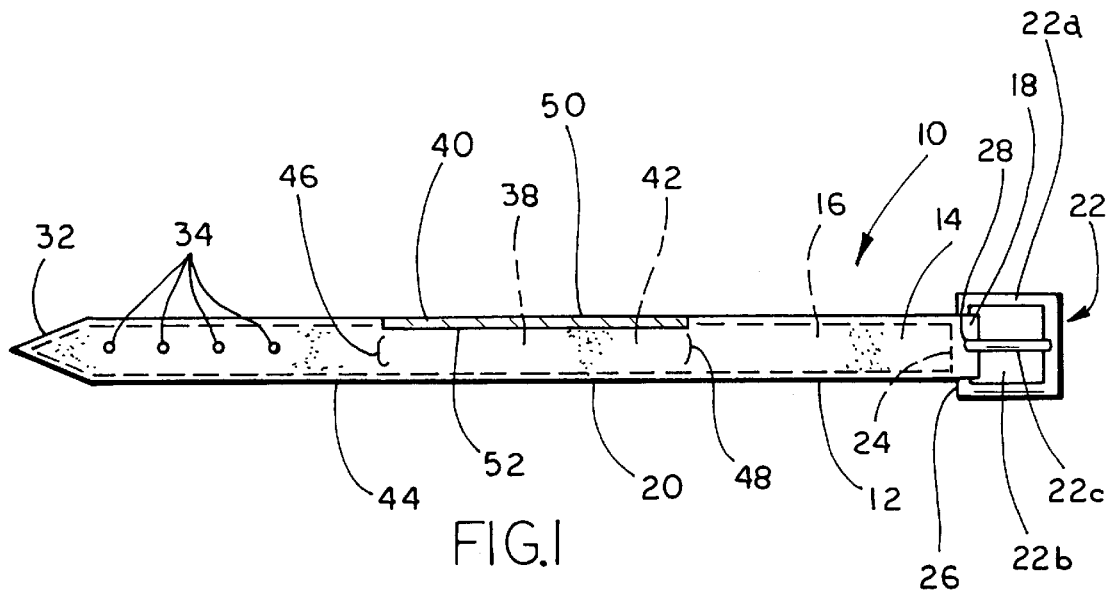
FIG. 1 is a side elevation view a collar of the present invention.
Figure 2:
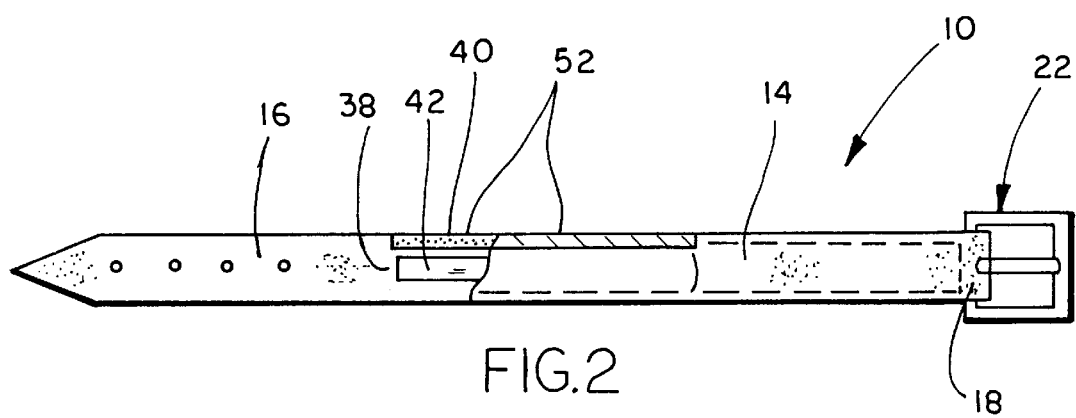
FIG. 2 is a partial fragmentary view of the collar of FIG. 1.
Figure 3:
FIG. 3 is a plan view of a scent/deodorant element of the collar of FIG. 1.

Referring to FIG. 1, the numeral 10 generally designates a collar of the present invention. Collar 10 includes a strap 12 which is formed from a pair of strap members 14 and 16 which are secured together by, for example stitching. At least one of the strap members is a porous material, such as a woven fabric often used in straps. The other strap member 14 or 16 may comprise a leather material, vinyl material, or the like. Strap members 14 and 16 optionally comprise a continuous strap which is folded back on its self at a medial portion which defines a first end 18. Alternately, strap portions or members 14 and 16 may comprise a continuous strap which is folded about a longitudinal axis 20 and then stitched along the free edges to form strap 12.

Collar 10 further includes a buckle 22 which is secured to end 18 in a conventional manner for forming a loop and securing collar 10 to the pet. In the illustrated embodiment, buckle 22 comprises conventional buckle with a frame 22a which defines an opening 22b and pin 22c which pivots about the frame 22a from an unlatched position to a latched position. Where strap members 14 and 16 comprise a continuous member which is folded about the medial portion, buckle 22 may be positioned at end 18 and then secured in place by stitches 24 which form a loop around a side member 26 of frame 22a. End 18 of strap 12 includes an opening 28 through which pin 22c of buckle 22 extends. Second end 32 of strap 12 includes one or more openings 34 for receiving pin 22c to secure first end 18 to second end 32. Preferably, strap 12 includes a plurality of openings 34 to provide adjustment. Optionally, second end 32 of strap 12 may comprise a pointed end to ease insertion through opening 22b of buckle 22.

Strap 12 further includes a cavity 38 which is defined between strap members 14 and 16 and between first and second ends 18 and 32. Cavity 38 preferably includes an access opening 50 along a longitudinal free edge 40 of strap 12 to permit placement of a scent/deodorant element 42 in strap 12 to thereby support the scented/deodorizing element 42 in strap 12. Preferably, cavity 38 is defined between stitching 44 along an opposed free edge 46 of strap 12 and between spaced apart stitching 46 and 48. Scented element 42 is inserted into cavity 38 through access opening 50 which is optionally closed by a closure mechanism 52, such as velcro, snaps, or by stitching. Most preferably, the closure mechanism 52 provides repeat access to cavity 38 to replace scented element 42 after scented element 42 is spent.

Scented element 42 preferably comprises a scent/deodorant stick, which is activated by the heat from the pets body. In this manner, when collar 10 is secured to the neck of the pet, scent/deodorant element 42 will generate a pleasant scent to neutralize or to mask the pets natural odor, which is offensive to many people. Scented element 42 may comprise a scent/deodorant impregnated element, such as a scent/deodorant impregnated cloth, a scent/deodorant impregnated string or wick, or a tablet.

It should be understood, however, that scented/deodorizing element 42 may be secured or supported by collar 12 in another manner. For example, strap 12 may include a longitudinal cavity with an opening extending transversely across one of the strap member 14 or 16. In addition, scented/deodorizing element 42 may be supported on strap 12 by plurality of loops which are formed on strap 12. Similarly, strap 12 may comprise a single strap member with a pocket secured to strap member 12 to form cavity 38 for supporting scented element 42. It also should be understood, that collar 10 may include other securement means to secure the strap 12 to the neck of the pet. For example, collar 10 may include a receptacle and tongue buckle, for example where one end of the strap includes the receptacle and the other end of the strap includes the tongue which releasably latches to the receptacle to secure one end of the strap 12 to the other end of the strap.

Accordingly, a collar for a pet which neutralizes or masks the pets natural odor is disclosed. While several forms of the invention have been shown and described, other changes and modifications will be apparent to those skilled in the art, for example, one or more of the strap members may be impregnated with a scent/deodorant or the cavity may include beads or granules of a heat activated scent/deodorant producing material. Furthermore, the cavity may be extended along the full length of the strap where the scent/deodorant element is flexible. It should be understood, that the embodiments disclosed herein are the preferred embodiments and that the scope of the patent is limited by the claims which follow.

We claim:

1. A collar for a pet comprising:

a strap having first and second end portions and inner and outer surfaces, said strap comprising a flexible woven porous material and having a cavity formed therein, said cavity including an access opening to permit a scent producing element to be positioned in and retrieved from said cavity and a releasable closure mechanism for releasably closing said access opening, and said first end portion adapted for coupling to said second end portion for securing said strap to a neck of the pet whereby said inner surface is directed for facing the neck of the pet and said outer surface is directed for facing outwardly from the pet; and a scent producing element fully enclosed and supported in said cavity of said strap, said woven porous material permitting the scent of said scent producing element to permeate through said inner surface toward the neck of the animal and permeate through said outer surface such that a person in at least general proximity to the pet can detect the smell of said scent producing element.

2. The collar according to claim 1, wherein said scent producing element comprises a heat activated scent producing element.

3. The collar according to claim 2, wherein said heat activated scent producing element comprises a heat activated scent stick.

4. The collar according to claim 1, wherein said scent producing element comprises a scent impregnated element.

5. The collar according to claim 4, wherein said scent impregnated element comprises a scent impregnated cloth.

6. The collar according to claim 4, wherein said scent impregnated element comprises a scent impregnated string.

7. The collar according to claim 1, wherein said strap is formed from an elongate member of said woven porous material, said elongate member being folded to form first and second facing sides to form said inner and outer surfaces, each of said first and second facing sides having a free edge, said first and second facing sides forming said cavity therebetween, and a portion of said free edges of said first and second facing sides defining therebetween said access opening with an other portion of said free edges being interconnected to form said cavity.

8. The collar according to claim 7, wherein said other portion of said free edges are connected by stitching.

9. The collar according to claim 1, wherein said closure mechanism comprises one of velcro, snaps, and stitching.

10. A collar for a pet comprising:

a strap having first and second strap members secured together, said strap having first and second ends, said first and second strap members each comprising a flexible woven porous material and forming an inner surface and an outer surface, said strap further including a cavity defined between said first and second strap members between said first and second ends, said cavity extending along a longitudinal axis of said strap and including an access opening formed along an edge of said strap, said access opening permitting a scent producing element to be positioned in or retrieved from said cavity through said access opening and including a releasable closure mechanism for releasably closing said access opening, and said strap being adapted to form a closed loop for securing to a neck of the pet whereby said inner surface is directed for facing the neck of the pet, and said outer surface is directed for facing outwardly from the pet; and a scent producing element fully enclosed and supported in said cavity and being insertable through said access opening of said strap, said woven porous material permitting the scent of the scent producing element to permeate through said inner surface toward the neck of the pet and through said outer surface such that a person in at least general proximity to the pet can detect the smell of said scent producing element.

11. The collar according to claim 10, wherein each of said strap members have opposed free edges defining opposed edges of said strap, a portion of said free edges defining therebetween said access opening, and remaining portions of said free edges being connected to form said cavity between said strap members.

12. The collar according to claim 11, wherein said remaining portions of said free edges are interconnected by stitching.

13. The collar according to claim 10, wherein said closure mechanism for closing said access opening comprises velcro.

14. The collar according to claim 10, wherein said closure mechanism comprises stitching.

15. The collar according to claim 10, wherein said scent producing element comprises a heat activated scent stick.

16. The collar according to claim 10, wherein said scent producing element comprises a heat activated deodorant stick.

17. The collar according to claim 10, wherein said access opening extends along a longitudinal extent of said strap.

* * * * *